United States Patent
Rard

(10) Patent No.: US 6,868,587 B2
(45) Date of Patent: Mar. 22, 2005

(54) STRAP TENSIONER

(76) Inventor: Roy Rard, 20461 Comet La., Mt. Vernon, WA (US) 98274

(*) Notice: Subject to any disclaimer, the term of this patent is extended or adjusted under 35 U.S.C. 154(b) by 0 days.

(21) Appl. No.: 10/659,524

(22) Filed: Sep. 10, 2003

(65) Prior Publication Data
US 2004/0075088 A1 Apr. 22, 2004

Related U.S. Application Data

(60) Provisional application No. 60/409,747, filed on Sep. 11, 2002.

(51) Int. Cl.[7] ............................................. A44B 11/26
(52) U.S. Cl. ............................ 24/170; 24/179; 24/191; 24/265 CD; 24/309; 24/662
(58) Field of Search ......................... 24/170, 191, 193, 24/625, 662, 313, 179, 171, 194, 265 CD, 265 BC, 68 CD, 309, 909; 297/483; 280/808; 54/23, 34

(56) References Cited

U.S. PATENT DOCUMENTS

| | | | |
|---|---|---|---|
| 2,513,169 A | 6/1950 | Griswold | 24/170 |
| 2,517,424 A * | 8/1950 | Griswold | 24/170 |
| 2,622,293 A | 12/1952 | Wermlinger | 24/170 |
| 2,998,626 A | 9/1961 | Prete, Jr. | 24/170 |
| 3,020,612 A | 2/1962 | Meeker | 24/170 |
| 3,253,309 A * | 5/1966 | Baresch | 24/170 |
| 3,413,691 A | 12/1968 | Elsner | 24/170 |
| 4,373,234 A | 2/1983 | Boden | 24/191 |
| 5,832,569 A | 11/1998 | Berg | 24/170 |
| 5,920,963 A * | 7/1999 | Chou | 24/170 |
| 6,360,410 B1 | 3/2002 | Lovato | 24/662 |
| 6,665,913 B2 * | 12/2003 | Kosh et al. | 24/193 |

* cited by examiner

Primary Examiner—Victor Sakran
(74) Attorney, Agent, or Firm—Dean A. Craine

(57) ABSTRACT

An improved strap tensioner that allows a user to manually shorten the strap by applying greater tension on the strap and easily lengthening the strap after being tightened. The tensioner includes a tension lever, an intermediate member, and a brake lever all pivotally mounted on a rigid base. The tension lever and brake member are longitudinally aligned on opposite sides of the rigid base. Formed on the tension lever is a transversely aligned clamping flange that extends under the strap when longitudinally extended through the rigid base. Formed on the intermediate member and disposed above the clamping flange is a first cam surface that forms a slot for the strap to extend through. The brake lever includes a second cam surface that is spaced above the front flange member to form a second slot. During operation, the brake lever is rotated to press the second cam surface against the front flange member to temporarily hold the strap inside the rigid base. During use, the tension lever, the intermediate member and the brake lever are sequentially coupled together to selectively engage, pull and release the strap allowing the strap to be tightened or loosened.

20 Claims, 5 Drawing Sheets

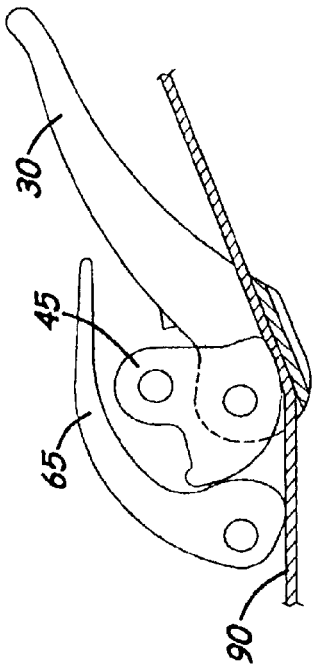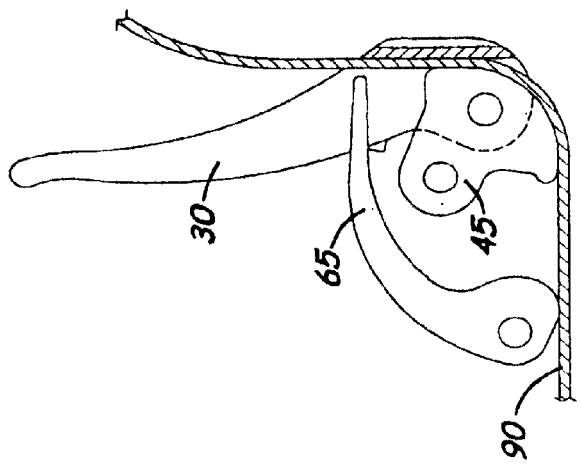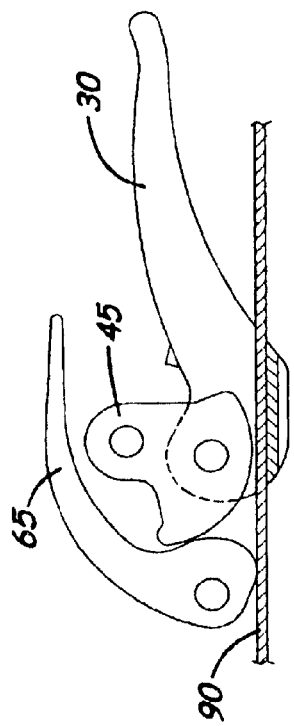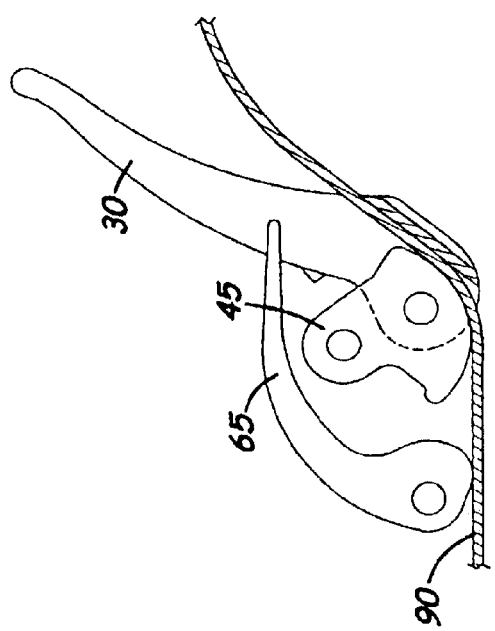

STRAP TENSIONER

This is a utility patent application which claims benefit of U.S. Provisional Application No. 60/409,747 filed on Sep. 11, 2002.

BACKGROUND OF THE INVENTION

1. Field of the Invention

This invention relates to devices used to tighten a strap, and more particularly, to such devices that enable the user to apply greater tension to the strap.

2. Description of the Related Art

Adjustable buckles used to tighten a strap around an object or to attach the ends of two straps together are very common. Typically, such buckles include an outer frame made of metal or plastic with one or more transversely aligned round pins that the loose end of the strap wraps around and binds against to hold the strap at a desired tension or length. In order to tighten the strap, the loose end or "bitter end" of the strap must be pulled in a direction opposite the direction to the strap. Unfortunately, the user is often unable to grip the loose end of the strap sufficiently to tighten the strap to the desired length or tension, or the buckle is unable to hold its grip and is slowly pulled towards the loose end of the strap. Even when the working end of the strap could be tightened to the desired length or tension, it is often difficult to loosen the strap from the buckle.

What is needed is an improved strap tensioner that enables a user to apply greater tension to one or two straps and to easily loosen the strap.

SUMMARY OF THE INVENTION

It is an object of the present invention to provide an improved strap tensioner used to manually apply greater tension to a strap than a standard buckle.

It is another object of the present invention to provide such a device that enables the user to easily tighten the strap to the desired amount of tension.

It is a further object of the present invention to provide such a device that also allows the strap to be easily loosened after being shortened or tightened to a desired amount.

These and other objects are met by the improved strap tensioner disclosed herein that is designed to be used with an existing flat strap. The tensioner includes manually operated tensioning and braking mechanisms coupled together to selectively adjust the tension of the adjustable working end of a strap.

More specifically, the device includes a rigid base upon which the adjustable working end of a strap is longitudinally extended over. The rigid base includes two parallel, longitudinally aligned side walls connected together by a front flange member, a rear flange member, a rear strut and an upper strut. The opposite, non-adjustable working end of the same strap, or the non-adjustable working end of a second strap may be securely wrapped around the rear strut to securely hold the rigid base in place. Alternatively, an optional hole may be formed in the rear flange member on the rigid base that receives a suitable connector that securely mounts the rigid base to a rigid surface.

Mounted inside the rigid base is a biased tension lever, a biased intermediate member, and a biased brake lever. The tension lever is longitudinally aligned inside the rigid base and pivotally connected to the intermediate member via a first pin. The tension lever is biased in the rearward direction which, during use, rotates upward approximately 90 degrees over the proximal end of the rigid base to the rigid base's mid-line axis. Formed on the distal end of the tension lever is a transversely aligned clamping flange that extends under the intermediate member and under a strap when longitudinally aligned over the rigid base.

The intermediate member is transversely aligned inside the rigid base and elevated slightly over the clamping flange on the tension lever. The tension lever is biased rearward in a rearward direction also called its opened position. The intermediate member is pivotally connected between the two sidewalls on the rigid base via a second pin. The intermediate member is also biased in the rearward direction, hereinafter called its closed position. The intermediate member and the tension lever include interlocking surfaces that enable them to rotate together when the tension lever is manually rotated in the forward direction.

Formed on the front lower surface of the intermediate member is a curved first cam surface. When the intermediate member is in its closed position, the first cam surface is spaced above the clamping flange on the tension lever thereby enabling a strap to slide longitudinally over the rigid base. When the tension lever is gradually rotated in a forward direction, the space between the first cam surface and clamping flange narrows and eventually pinches against the strap. When the tension lever is further rotated in a forward direction, the intermediate member is engaged by the tension lever and also begins to rotate in the forward direction.

The brake lever is longitudinally aligned and pivotally attached between the two side walls directly in front of the intermediate member. The brake lever is biased in the rearward position, hereinafter called its closed position, and is designed to rotate in a forward direction in a 90 degree arc over the distal end of the rigid base into an opened position. Formed on the lower end of the brake lever is a second cam surface that is located directly above the rigid base's front flange member. When the brake lever is rotated rearward into the closed position, the second cam surface is forced downward and presses tightly against the strap thereby preventing the strap's longitudinal movement over the rigid base. When the brake lever is rotated forward to an opened position, the second cam surface rotates upward thereby releasing the strap and allowing its longitudinal movement over the rigid base.

During operation, the end of a non-adjustable working section of the strap is securely attached around the rear strut on the rigid base. Alternatively, the rigid base may be mounted onto a rigid surface. The brake lever is rotated to its opened position so that the loose end of the strap may be longitudinally aligned over the rigid base and inserted into the narrow slot formed between the second cam surface and the front flange member. The adjustable working end of the strap is then further extended longitudinally over the rigid base and through the space formed between the first cam surface and the clamping flange, under the tension lever and through the proximal end of the rigid base. When the tension lever is rotated to its closed position, the tension lever engages the intermediate member and binds the first cam surface against the strap. As the tension lever is further rotated in the forward direction, it then eventually contacts the upper section of the brake lever and causes the brake lever to slightly move to an opened position so that the strap may slide freely under the brake lever. When the tension lever is completely rotated in a forward direction, the strap may be pulled longitudinally over the rigid base. When the tension lever is rotated in the rearward direction and returned to its opened position, the brake lever closes and binds the strap again. When the tension lever is rotated in the forward direction again, the brake lever is released and additional strap is pulled over the rigid base.

Because the tension lever and intermediate member are selectively engaged to bind to the strap, the user may easily use the tension lever to quickly pull the strap through the slot formed between the second cam surface and the flange member. Because the brake member is biased in a closed position to hold the strap as the tension lever is moved in a forward direction, the strap is prevented from being pulled back through the rigid base as the strap is tightened. Also, because the brake lever is biased in the closed position, the strap may be easily loosened by rotating the brake member forward to the opened position. Because the tension lever can be used to open the brake lever, the user may intermittently loosen the strap by rotating the tension lever to tap or slightly move the brake lever between closed and opened positions.

In summary, the improved strap tensioner allows the user to easily tighten a strap by simply moving the tension lever back and forth over the rigid base. Because the tension lever may be selectively bound to the strap, and because the brake lever prevents the strap from being pulled through the rigid base, greater tension may be applied to the strap of the strap tensioner than to a standard buckle. The user may easily loosen the strap by simply moving the brake lever to the unlocked position or by using the tensioning lever to intermittently control the brake lever.

DESCRIPTION OF THE DRAWINGS

FIGS. 9a–d are side elevational views of the improved strap tensioner showing the movement of the tension lever, intermediate member, and the brake lever as a strap is pulled through the device.

DESCRIPTION OF THE PREFERRED EMBODIMENT(S)

Referring to the accompanying FIGS. 1–12, wherein like reference numbers refer to like components, there is shown an improved strap tensioner 10 designed to allow a user to manually tighten the strap 90 by applying greater tension to a strap 90 than buckles or other strap tensioners that exist in the prior art.

Figure 3:
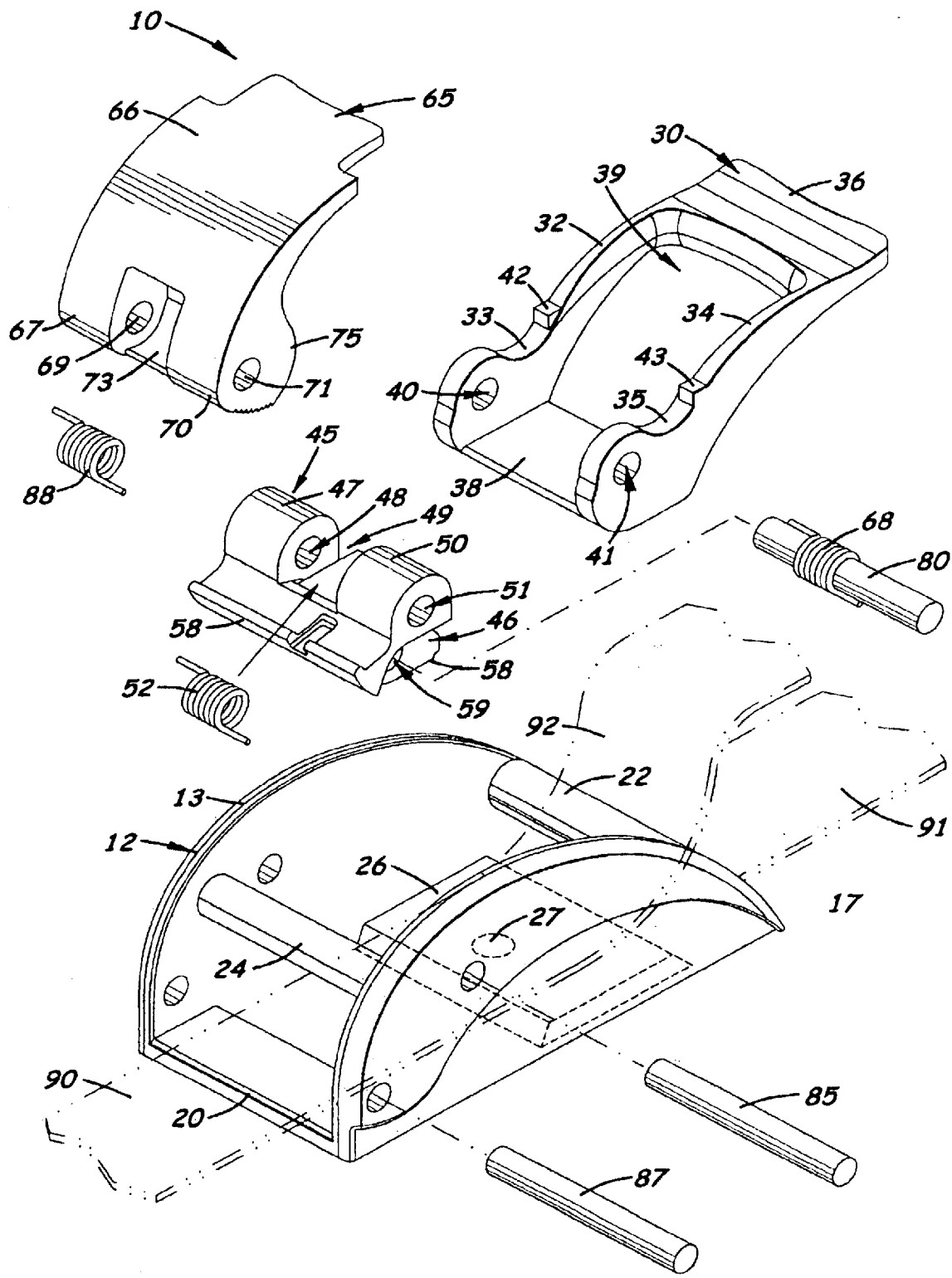
FIG. 3 is a perspective, exploded view of the improved strap tensioner.
Figure 4:
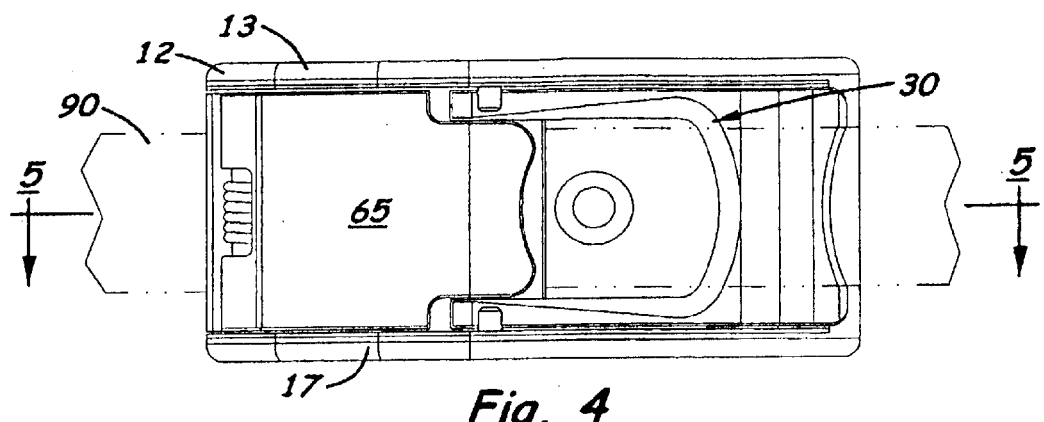
FIG. 4 is a top plan view of the improved strap tensioner.

As shown in FIG. 3, the strap tensioner 10 includes a rigid base 12 upon which the strap 90 is longitudinally extended over. The rigid base 12 includes two parallel, longitudinally aligned side walls 13, 17 connected together by a front flange member 20, a rear strut 22, an upper strut 24, and a rear flange member 26. The non-working end 91 of the strap 90 or one end of a second strap (not shown) is securely wrapped around the rear strut 22 to securely connect the rigid base 12 thereto. The free or working end 92 of the strap 90 enters the distal end and exits the proximal end of the tensioner 10. An optional hole 27 is formed in the rear flange member 26 that enables the rigid base 12 to be securely attached to a rigid surface using a suitable connector (not shown).

Mounted inside the rigid base 12 is a biased tension lever 30, a biased intermediate member 45, and a biased brake lever 65. The tension lever 30 is longitudinally aligned inside the rigid base 12 and pivotally connected to the intermediate member 45. The tension lever 30 includes two parallel, longitudinally aligned side arms 32, 34, a transversely aligned upper handle 36, a transversely aligned lower clamping flange 38, and a central opening 39 located between the upper handle 36 and the lower clamping member 38. Formed on the lower ends of the two side arms 32, 34 are two bores 40, 41, respectively, that receive the pin 80. Also formed on the upper surfaces of the side arms 32, 34 are recessed nesting surfaces 33, 35 that receive the ear members 47, 50 formed on the intermediate member 45 when the tension lever 30 is rotated forward over the intermediate member 45. Formed above the nesting surfaces 33, 35, are optional stop surfaces 42, 43, respectively, that limit the forward rotational movement of the tension lever 30 over the brake lever 65.

Figure 5:
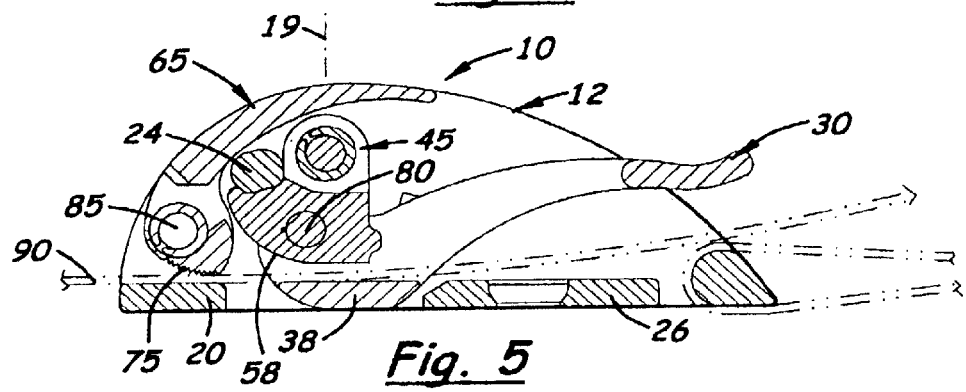
FIG. 5 is a sectional, right side elevational view of the improved strap tensioner as shown along line 5—5 in FIG. 4.
Figure 6:
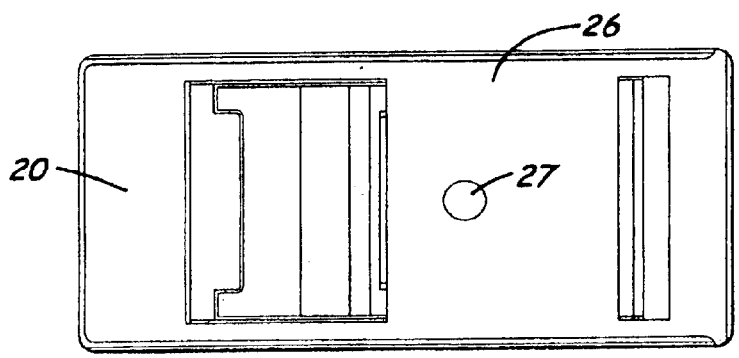
FIG. 6 is a bottom plan view of the improved strap tensioner.
Figure 7:
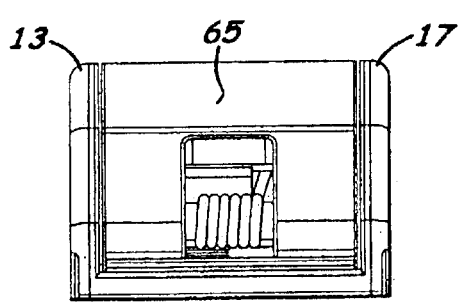
FIG. 7 is a front end elevational view.
Figure 8:
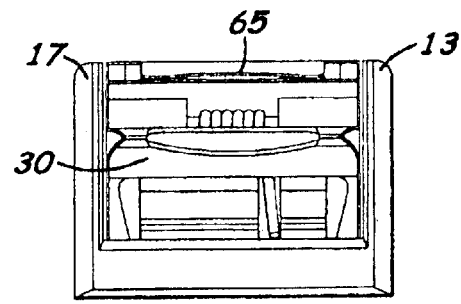
FIG. 8 is a rear end elevational view.
Figure 10:
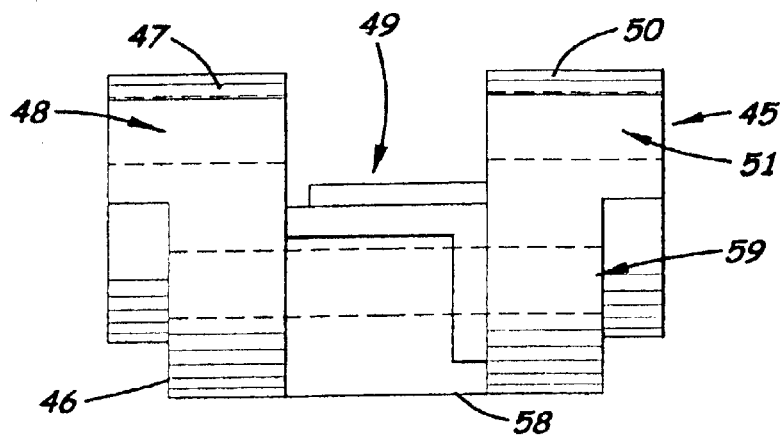
FIG. 10 is a front elevational view of the intermediate member.
Figure 11:
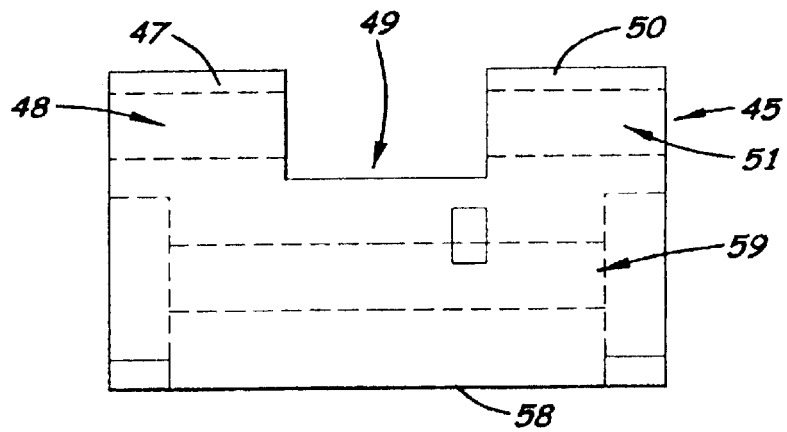
FIG. 11 is a rear elevational view of the intermediate member.
Figure 12:
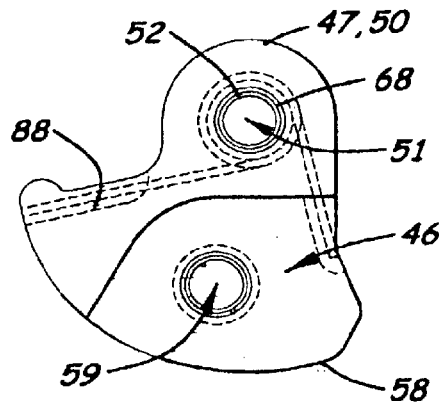
FIG. 12 is a side elevational view of the intermediate member.

Extending transversely between the two side walls 13, 17 is an upper strut 24 which acts as a stop surface to prevent excess clockwise rotation of the intermediate member 45. As shown in FIG. 5, during assembly the front section of the intermediate member 45 extends under the upper strut 24.

During assembly, a spring 68 is placed around pin 80 that forces the upper handle 36 rearward and over the proximal end of the rigid base 12. During use, the tension lever 30 rotates inside the rigid base 12 moving the upper handle 36 in an approximate 90 degree arc from the proximal end of the rigid base 12 to the rigid base's mid-line axis 19, (see FIG. 5). During use, the tension lever 30 is positioned so that the clamping flange 38 extends under a strap 90 aligned longitudinally over the rigid base 12.

Also shown in FIG. 3, is an intermediate member 45 transversely aligned inside the rigid base 12 just in front of and above the clamping flange 38 on the tension lever 30. The intermediate member 45 includes two ear members 47, 50 as mentioned above. Formed in each ear member 47, 50 is a bore 48, 51, respectively, that also receives a second pin 85. During assembly, the second pin 85 is inserted through bores 15, 18 and transversely aligned between the two side walls 13, 17, respectively, to pivotally connect the intermediate member 45 to the rigid base 12. Formed between the two ears members 47, 50 is a central space 49 in which a first coiled spring 52 is placed. During assembly, the coiled spring 52 is inserted around the second pin 85 and used to force the intermediate member 45 in a rearward direction against strut 24.

Formed on the lower section 46 of the intermediate member 45 is a first cam surface 58. When the intermediate member 45 is in its opened position, the first cam surface 58 is spaced apart from the clamping flange 38 on the tension lever 30 so that the strap 90 may freely slide therebetween. Formed inside the lower section 46 of the intermediate member 45 is a transversely aligned bore 59. During assembly, the first pin 80 is inserted into the bore 59 to pivotally connect the tension lever 30 to the intermediate member 45. A first spring 68 is disposed around the first pin 80 and used to bias the tension lever 30 and intermediate member 45 in opposite directions. As shown in FIGS. 9A–9D, when the tension lever 30 is initially rotated in a forward direction, the intermediate member 45 is not engaged. As the tension lever 30 is further rotated, the space between the first cam surface 58 and clamping flange 38 narrows which enables the tension lever 30 to securely engage the strap 90. When the tension lever 30 is further rotated in a forward direction, the intermediate member 45 is completely engaged therewith and begins to rotate in the same direction as the tension lever 30. Because the first cam surface 58 is curved, the strap 90 bends around the first cam surface 58 which allows the strap 90 to be pulled through the rigid base 12.

During operation, the two ear members 47, 50 on the intermediate member 45 are engaged by the nesting surfaces 33, 35 formed on the tension lever 30 when the tension lever 30 is rotated in a forward direction a sufficient amount. When the tension lever 30 is rotated approximately 30 degrees, the nesting surfaces 33, 35 receive the ear members 47, 50 thereby coupling them together.

Figure 1:
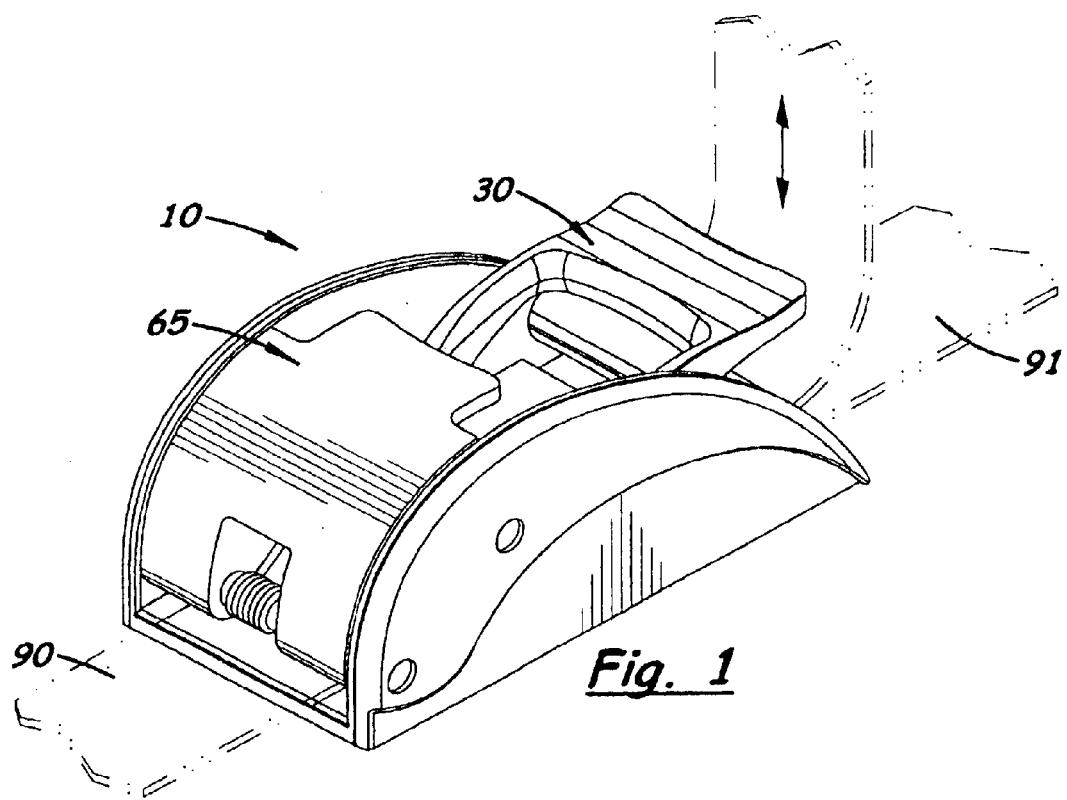
FIG. 1 is a perspective view of the improved strap tensioner showing the tension lever moved in the closed position.
Figure 2:
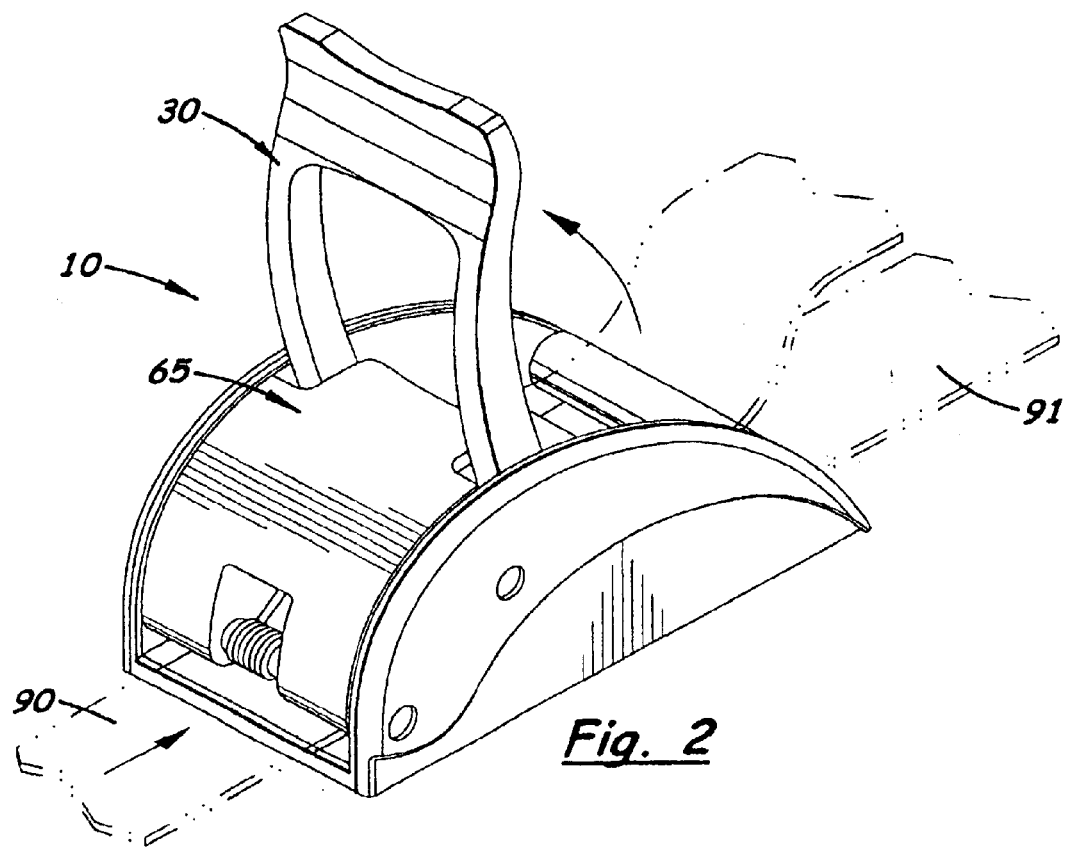
FIG. 2 is a perspective view of the improved strap tensioner shown with tension lever and brake lever both in the opened position.

As shown in FIGS. 1–3, the brake lever 65 is longitudinally aligned and pivotally attached between the two side walls 13, 17 directly in front of the intermediate member 45. The brake lever 65 includes a rectangular, curved body 66 with two downward extending ears 67, 70. Formed in each ear 67, 70 is a bore 69, 71, respectively, that receives a lower, transversely aligned third pin 87 that extends transversely between two bores 14, 16 formed the two side walls 13, 17, respectively. The pin 87 is used to pivotally connect the brake lever 65 to the rigid base 12. Formed in between the two ears 67, 70 is a central space 73. Disposed inside the space 73 and around the pin 87 is a second spring 88 used to bias the brake member 65 in a rearward direction and binds against the strap 90 as shown in FIG. 9A.

Formed on the lower end of the brake lever 65 is a second cam surface 75 that is located directly above the front flange member 20 when assembled. When the brake lever 65 is rotated in a rearward direction, the second cam surface 75 is forced downward to press against the strap 90 to prevent forward movement of the strap 90 (denoted M(f) in FIG. 9C). When the second cam surface 75 is pressed against the strap 90, rearward movement of the strap 90 by moving the tension lever 30 is still permitted. When the brake lever 65 is rotated in a forward direction, the second cam surface 75 moves upward thereby disengaging the strap 90 completely and allowing the strap 90 to be moved longitudinally over the rigid base 12.

During operation, the non-working end 91 of the strap 90 is securely attached around the rear strut 22 on the rigid base 12. The brake lever 65 is rotated forward so that the opposite end 92 of the same strap 90 or one end of a second strap (not shown) may be inserted into the narrow space formed between the second cam surface 75 and the front flange member 20. The strap 90 is then further extended through the space until it may be engaged by the tension lever 30 and the intermediate member 45. The tension lever 30 is rotated in a forward direction to advance the strap 30 through the rigid base 12. If the tension lever 30 is rotated in a forward direction to press against the brake lever 65, the brake lever 65 may be slightly rotated in a forward direction to allow the strap 90 to advance more freely in the rigid base 12.

Because the brake lever 65 binds the strap 90 in one direction and is biased in the closed position, the strap 90 is temporarily held by the tensioner 10 has the user easily operates the tension lever 30 to pull the strap 90 through the rigid base 12. Because the rotation of the tension lever 30 is opposite the direction of the strap 90 through the rigid base 12, the user is able to exert greater force of the strap 90. Because the tension lever 30 is biased to the disengaged position, the strap 90 may be easily loosened by rotating the brake lever 65 in a forward direction.

In summary, the improved strap tensioner 10 allows the user to easily tighten a strap 90 by simply moving the tension lever 30 back and forth over the rigid base 12. Because the brake lever 65 temporarily holds the strap 90 and prevents it from slipping out of the rigid base 12, and because the tension lever 30 is rotated in a direction opposite the direction of the strap 90 when tightened, greater tension may be applied to the strap 90.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An improved strap tensioner comprising:
   a. a rigid base with a front flange member and a rear flange member;
   b. an intermediate member pivotally connected to said rigid base, said intermediate member including a lower first cam surface;
   c. a tension lever longitudinally aligned and pivotally mounted to said intermediate member, said tension lever including a lower clamping flange;
   d. means for pivotally connecting said tension lever to said intermediate member so that said first cam surface is disposed above said lower clamping flange on said tension lever;
   e. means for biasing said tension lever and said intermediate member in opposite directions;
   f. a means for biasing said intermediate member in a rearward direction on said rigid base;
   g. a means for coupling the movement of said tension lever and said intermediate member so that when said tension lever is rotated a predetermined distance in a forward direction, said intermediated member is engaged and begins to rotate in a forward direction;
   f. a brake lever pivotally connected to said rigid base, said brake lever including a second cam surface that presses against a strap extended longitudinally onto said rigid base to prevent movement of said strap when extended through said rigid base and disposed under said first cam surface; and,
   g. a biasing means connected to said brake lever to forcible press said second cam surface against a strap extended longitudinally over said rigid base and under said first cam surface.

2. The strap tensioner as recited in claim 1, wherein said rigid base includes two longitudinally aligned side walls, a transversely aligned front flange member, a transversely aligned rear flange member, a transversely aligned upper strut and a transversely aligned rear strut.

3. The strap tensioner as recited in claim 2, wherein said intermediate member includes two upper ear members located opposite said first cam surface, each said upper ear member including a transversely aligned bore formed therein.

4. The strap tensioner as recited in claim 3, further including a pin disposed transversely between said side walls on said rigid base used to pivotally attached said intermediate member and said tension lever to said rigid base.

5. The strap tensioner as recited in claim 4, wherein said means for biasing said intermediate member in a rearward direction on said rigid base is spring disposed over said pin said spring presses against said intermediate member and said upper strut on said rigid base to force said intermediate member in a rearward direction on said rigid base.

6. The strap tensioner as recited in claim 5, wherein said tension lever includes a central opening that enables a strap to extend through said rigid base.

7. The strap tensioner as recited in claim 1, wherein said means for pivotally connecting said tension lever to said intermediate member is a transversely align pin.

8. The strap tensioner as recited in claim 7, further include a spring disposed around said pin to bias said tension lever and intermediate member in opposite directions over said rigid base.

9. The strap tensioner as recited in claim 8, wherein said tension lever includes two nesting surfaces that engage the ear members on said intermediate member when said tension lever is sufficiently rotated in rearward direction over said rigid base.

10. The strap tensioner as recited in claim 1, wherein said brake lever includes means for engaging said tension lever when said tension lever is sufficiently rotated in a forward direction over said rigid member thereby forcing said brake lever forward when said tension lever is rotated in a forward direction a sufficient distance.

11. The strap tensioner as recited in claim 4, wherein said brake lever includes means for engaging said tension lever when said tension lever is sufficiently rotated in a forward direction over said rigid member thereby forcing said brake lever forward when said tension lever is rotated in a forward direction a sufficient distance.

12. The strap tensioner as recited in claim 10, wherein said brake lever includes means for engaging said tension lever when said tension lever is sufficiently rotated in a forward direction over said rigid member thereby forcing said brake lever forward when said tension lever is rotated in a forward direction a sufficient distance.

13. The strap tensioner as recited in claim 10, wherein said brake lever includes means for engaging said tension lever when said tension lever is sufficiently rotated in a forward direction over said rigid member thereby forcing said brake lever forward when said tension lever is rotated in a forward direction a sufficient distance.

14. The strap tensioner as recited in claim 1, wherein said brake lever includes two ears located at one end, each ear include a bore and being separated by a central space.

15. The strap tensioner as recited in claim 12, wherein said biasing means connected to said brake lever to forcible press said second cam surface against a strap extended longitudinally over said rigid base and under said first cam surface is a spring disposed over a transversely aligned pin and located inside said central space.

16. An improved strap tensioner comprising:

a. a rigid base that includes two side walls and transversely aligned front flange member, a transversely aligned rear flange member, a transversely aligned upper strut and a transversely aligned rear strut;

b. a tension lever longitudinally aligned located over said rear flange member, said tension lever including a lower clamping flange that extends downward and under a strap when disposed longitudinally over said front flange member and rear flange members, said tension lever includes a central opening that enables a strap to extend through said rigid member;

c. an intermediate member pivotally connected to said rigid base and located adjacent to said upper strut, said intermediate member including a lower first cam surface that extends downward to engage a longitudinally aligned strap disposed inside said rigid base and between said side walls;

d. a transversely aligned pin disposed between said tension lever and said intermediate member to pivotally connect said tension lever and said intermediate member together;

e. means for biasing said tension lever and said intermediate member in opposite directions;

f. a means for biasing said intermediate member in a rearward direction on said rigid base;

g. a means for coupling the movement of said tension lever and said intermediate member so that when said tension lever is rotated in predetermined amount in a forward direction, said intermediated member is engaged and begins to rotate in a forward direction;

h. a brake lever pivotally connected to said rigid base, said brake lever including a second cam surface that presses against a strap extended longitudinally on said rigid base to prevent movement of said strap when extended through said rigid base and disposed under said first cam surface; and, i. a biasing means connected to said brake lever to forcible press said second cam surface against a strap extended longitudinally over said rigid base and under said first cam surface.

17. The strap tensioner as recited in claim 16, wherein said intermediate member includes two upper ear members located opposite said first cam surface, each said upper ear including a transversely aligned bore formed therein.

18. The strap tensioner as recited in claim 17, wherein said tension lever includes two nesting surfaces that engage said ear members on said intermediate member when said tension lever is sufficiently rotated in rearward direction over said rigid base.

19. The strap tensioner as recited in claim 18, means for biasing said tension lever and said intermediate member is a spring disposed over a pin used to connect said tension lever and said intermediate members together.

20. The strap tensioner as recited in claim 16, wherein said brake lever includes means for engaging said tension lever when said tension lever is sufficiently rotated in a forward direction over said rigid base thereby forcing said brake lever forward when said tension lever is rotated in a forward direction a sufficient distance.

* * * * *